(12) United States Patent
Drews

(10) Patent No.: US 6,539,480 B1
(45) Date of Patent: Mar. 25, 2003

(54) SECURE TRANSFER OF TRUST IN A COMPUTING SYSTEM

(75) Inventor: Paul C. Drews, Gaston, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/224,003

(22) Filed: Dec. 31, 1998

(51) Int. Cl.⁷ ................................................ H04L 9/32
(52) U.S. Cl. ........................ 713/191; 713/189; 380/279
(58) Field of Search ........................ 713/1–2, 187–201, 713/182, 155, 100, 157, 156; 380/279, 281, 282

(56) References Cited

U.S. PATENT DOCUMENTS 5,717,759 A * 2/1998 Micali ......................... 713/157
5,844,986 A * 12/1998 Davis .......................... 713/187
6,058,478 A * 5/2000 Davis .......................... 712/191

OTHER PUBLICATIONS

Schneier, Bruce. Applied Cryptography: Protocols, Algorithms, and Source Code in C. Oct. 1995. p. 38.*

* cited by examiner

Primary Examiner—Gail Hayes
Assistant Examiner—Ho S. Song
(74) Attorney, Agent, or Firm—Schwegman, Lundberg, Woessner & Kluth, P.A.

(57) ABSTRACT

A computing system having a security module to validate requests to reconfigure a computing system. The computing system includes a persistent store for holding information indicative of the current trusted authority. A security module executing on the computing system determines whether to grant a request to modify configuration data within the computing system as a function of the information within the persistent store. In one particular embodiment, the security module facilitates the secure transfer of trust from one trusted authority to another, such as from a manufacturer to a customer. In another embodiment the security module validates a request to overwrite configuration data such as the computer's boot image or compact verification data for validating the computer's boot image.

34 Claims, 5 Drawing Sheets

SECURE TRANSFER OF TRUST IN A COMPUTING SYSTEM

TECHNICAL FIELD

This invention relates generally to the field of secure computing environments and, more particularly, to a method and apparatus for securely transferring trust from a current trusted authority to a new trusted authority in a computing system.

BACKGROUND INFORMATION

There are many challenges to creating a highly secure computing environment such as preventing eavesdroppers from accessing private communications, preventing vandals from tampering with information while in transit from sender to receiver, authenticating users logging into a network, verifying a network server is indeed the server it professes to be and safeguarding confidential documents from unauthorized individuals.

One of the more difficult challenges is preventing unauthorized individuals from changing the basic configuration of a computer such as changing the software that is used to start the computer. In order to prevent changes to such software, known as the boot image, conventional systems rely on passwords and other security measures to prevent unauthorized physical access. These measures, however, do not protect network computers that load the startup software over a network. For example, these measures do not protect network computers from downloading startup software that has been damaged or tampered with. In addition, these measures require activation by an administrator and, therefore, do not prevent unauthorized alterations to the computer during transit from the manufacturer to the customer. Thus, manufacturers are unable to "guarantee" that the delivered computer has not been tampered with.

For the reasons stated above, and for other reasons stated below which will become apparent to those skilled in the art upon reading and understanding the present specification, there is a need in the art for a security module that protects a computer against unauthorized changes to configuration data. There is also a need for a security module that prevents any such changes immediately after manufacturing. There is also a need for such a mechanism that securely transfers authority from the manufacturer to the customer.

SUMMARY OF THE INVENTION

As explained in detail below, the present invention provides a security module for verifying whether a request to reconfigure a computing system was indeed issued by a trusted authority. As such, the present invention facilitates the secure transfer of trust from one trusted authority to another, such as from a manufacturer to a customer.

According to one aspect, the invention is a computing system having a persistent store for holding information indicative of a current trusted authority. A security module executing on the computing system determines whether to grant a request to modify configuration data within the computing system as a function of the information within the persistent store. In another embodiment the invention is a method for manufacturing a computer system having such a security module.

According to another aspect, the invention is a method for securely transferring trust in a computer system from a first trusted authority to a second trusted authority. Information indicative of a first trusted authority is stored in a persistent store of a computer. When a request to overwrite the information with information indicative of a second trusted authority is received, the invention determines whether the first trusted authority issued the request. The information within the persistent store is overwritten with the information indicative of the second trusted authority when the first trusted authority issued the request.

According to yet another aspect, the invention is a method for configuring a computing system. A request to reconfigure the computing system is validated as a function of trusted authority information maintained by the persistent store within the computer. The computing system is configured with the new data when the request is validated. These and other features and advantages of the invention will become apparent from the following description of the preferred embodiments of the invention.

DETAILED DESCRIPTION

In the following detailed description, references are made to the accompanying drawings that illustrate specific embodiments in which the invention may be practiced. Electrical, mechanical, programmatic and structural changes may be made to the embodiments without departing from the spirit and scope of the present invention. The following detailed description is, therefore, not to be taken in a limiting sense and the scope of the present invention is defined by the claims.

Figure 1:
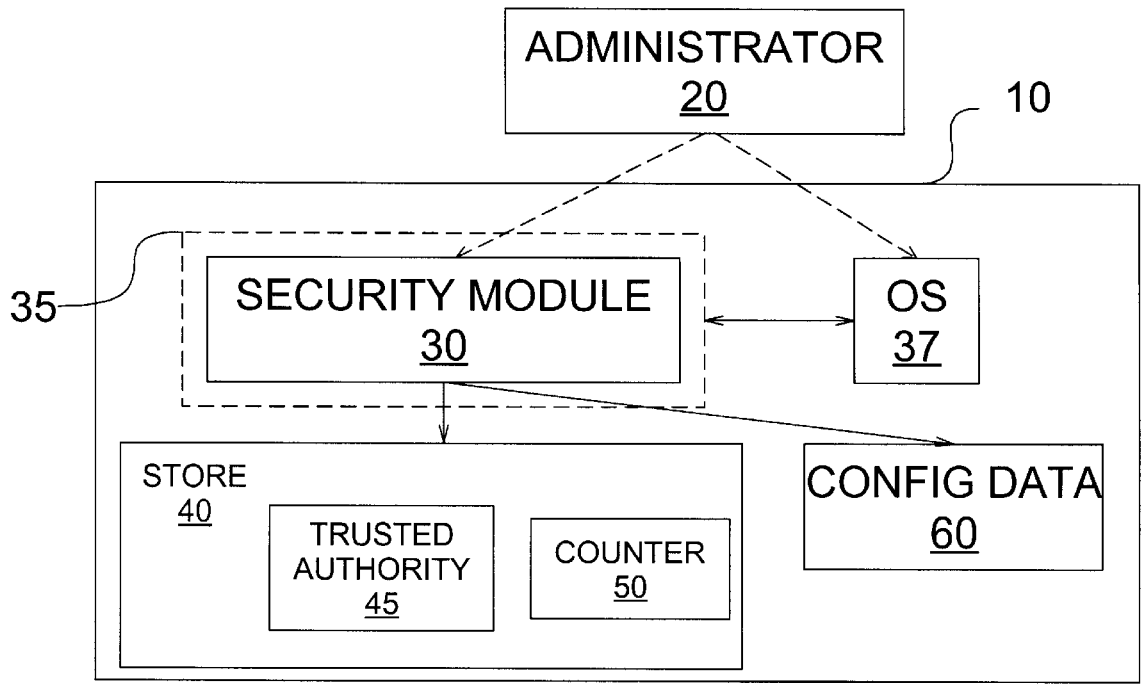
FIG. 1 is a block diagram of a computer having a mechanism for securely transferring trust from a first trusted authority to a second trusted authority according to the invention.

FIG. 1 illustrates a computer 10 having a security module 30 for securely transferring trust from a first trusted authority to a second trusted authority. Computer 10 represents a general purpose computing device and includes various internal computing components (not shown) including processing units, read only memory (ROM), random access memory (RAM), and one or more busses that operatively couple the components. There may be only one processing unit, such that computer 10 comprises a single central-processing unit (CPU), or a plurality of processing units, commonly referred to as a parallel processing environment. Basic input/output system (BIOS) 35 contains all code required to control basic devices including a keyboard, a display screen, disk drives, serial communications, etc. Operating system (OS) 37 controls access to BIOS 35 and provides an interface upon which application programs can execute.

Security module 30 is a software or firmware module executing on computer 10 that detects and prevents unauthorized individuals from changing configuration data 60 of computer 10. Security module 30 offers such protection immediately after computer 10 is manufactured and, therefore, manufacturers are able to "guarantee" that computer 10 has not been tampered with prior to receipt by the customer. More particularly, security module 30 maintains trusted authority information 45 in persistent store 40, which represents any storage area that survives across rebooting of computer 10. For example, persistent store 40 may be flash memory, battery-backed complementary metal oxide semiconductor (CMOS) memory, a magnetic storage medium such as a diskette, etc.

As explained in detail below, security module 30 grants a request to update trusted authority information 45, or to modify configuration data 60, as a function of the trusted authority information 45 maintained in persistent store 40. The calling entity that issues the modification request is typically either BIOS 35 or operating system 37 in response to a proposed action via system administrator 20.

In one embodiment, configuration data 60 represents a set of stored software routines that are loaded and executed in order to successfully boot computer 10. This set of software routines typically includes a current version of operating system 37, current device drivers, etc., and is referred to as the boot image. In another embodiment, configuration data 60 represents compact verification data for an external boot image. The invention, however, is not limited to protecting startup software; configuration data 60, therefore, represents any stored item that is desirable to protect such as cryptographic information. As in conventional computers, configuration data 60 may be stored on an internal magnetic storage medium such as an internal hard-disk. Alternatively, computer 10 may download configuration data 60 over a network whenever computer 10 is started or rebooted. In another embodiment, computer 10 may verify a downloaded boot image using compact verification data stored as configuration data. In either of these embodiments security module 30 ensures that the downloaded configuration data 60 originated from a trusted authority.

As illustrated in FIG. 1, security module 30 may be integrated with BIOS 35. Alternatively, security module 30 may be independent from BIOS 35. In one embodiment security module 30 provides security for computer 10 during startup until control of computer 10 is transferred to operating system 37. During this period, security module 30 verifies that configuration data 60 was created by the trusted authority identified by the information maintained within persistent store 40. In this fashion, security module 30 protects computer 10 from loading configuration data 60 in the event that it has been damaged, corrupted or tampered with.

In another embodiment, security module 30 protects configuration data 60 even after startup is complete and operating system 37 controls computer 10. In this embodiment, security module 30 allows operating system 37 to overwrite configuration data 60 only when security module 30 verifies that administrator 20 is indeed the trusted authority identified by the information maintained in persistent store 40. Security module 30 further verifies that the modification request is unique to computer 10 and unique in time.

The trusted authority information 45 maintained within persistent store 40 represents any information that may be used to uniquely identify the current trusted authority. In addition to protecting configuration data 60, security module 30 provides a process for administrator 20 to modify the trusted authority information 45 maintained in persistent store 40. This process allows administrator 20 to overwrite the identity of the current trusted authority with a new identity, thereby securely transferring trust from the current trusted authority to a new trusted authority. Preferably, security module 30 maintains cryptographic information within persistent store 40 to identify the current trusted authority. For example, in one embodiment security module 30 uses public key based digital signatures to validate any request to modify protected configuration data 60 or trusted authority information 45. The security module 30, however, can use any suitable digital signature algorithm to verify the request.

Figure 2:
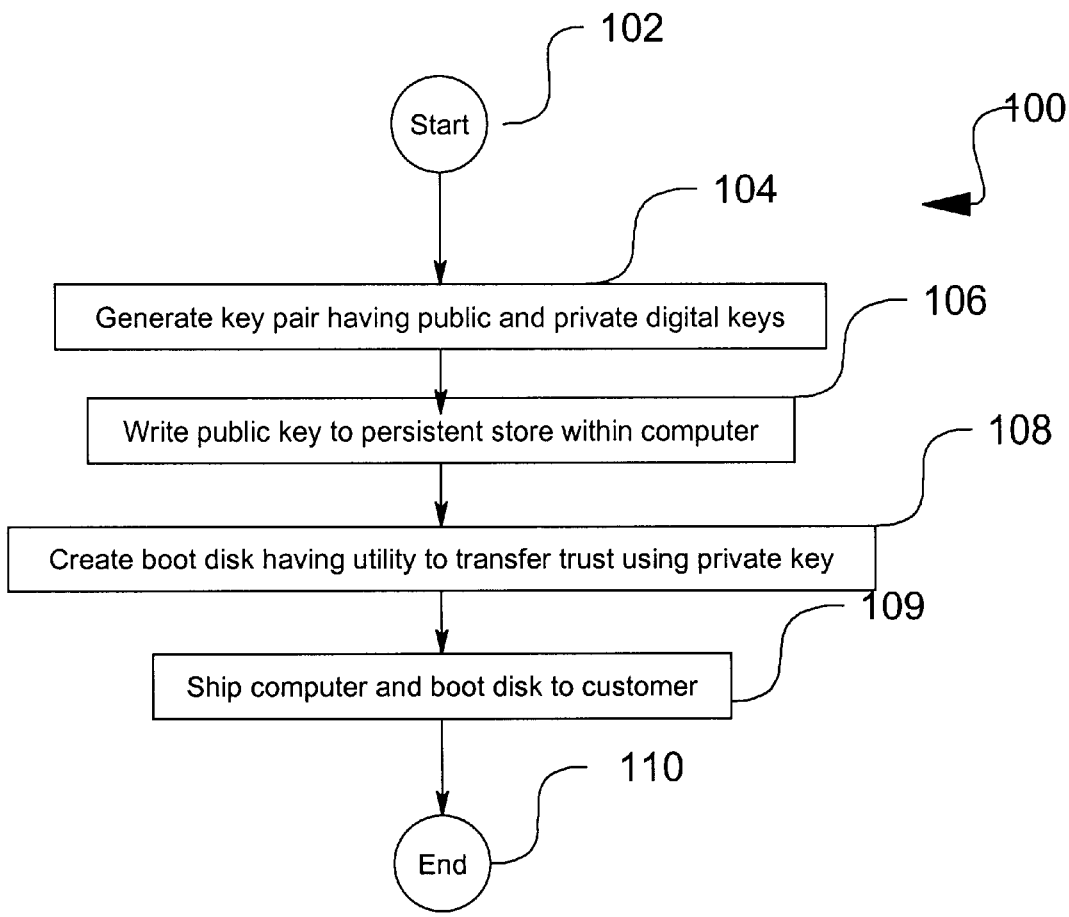
FIG. 2 is a flowchart illustrating a manufacturing process for producing a computer having a security module that immediately prevents unauthorized individuals from tampering with the computer upon completion of the manufacturing process.

FIG. 2 is a flow chart illustrating a manufacturing process 100 for producing a computer having a security module that prevents unauthorized individuals from tampering with the computer upon completion of the manufacturing process. The manufacturing process 100 begins in block 102, proceeds to block 104 and generates a pair of asymmetric keys according to conventional public key cryptography.

In one embodiment, the manufacturer generates a unique key pair for each computer 10. In this embodiment, the trusted authority information 45 for each computer 10 must be securely reconfigured to the customer's needs upon receipt. In another embodiment, the customer generates the key pair and communicates the public key to the manufacturer for use with one or more computers 10 manufactured for the customer. In this embodiment, the manufacturer writes the received public key into one or more computers 10 for shipment to the customer. This embodiment is advantageous in that trust need not be subsequently transferred from the manufacturer to the customer. As another alternative, the manufacturer configures computer 10 as described above but ships the computer 10 unsecurely such that persistent store 40 is uninitialized.

In block 106 the public key of the generated key pair is written to persistent store 40 within computer 10. At this point, security module 30 is able to validate that any subsequent request to change configuration data 60 was initiated by the current trusted authority.

In block 108, the private key is conveyed to the customer. For example, in one embodiment the private key of the key pair is written to a utility disk that will be shipped with the corresponding computer 10. In addition to storing the private key for the current trusted authority, the disk includes a utility for transferring authority to the customer as described in FIG. 3. In one embodiment, the disk includes startup software for computer 10 such that the disk may be used to boot computer 10. After producing computer 10 and the disk according to blocks 104, 106, and 108 the manufacturer ships computer 10 and the corresponding disk to the customer in block 109. The manufacturing process terminates in block 110.

Figure 3:
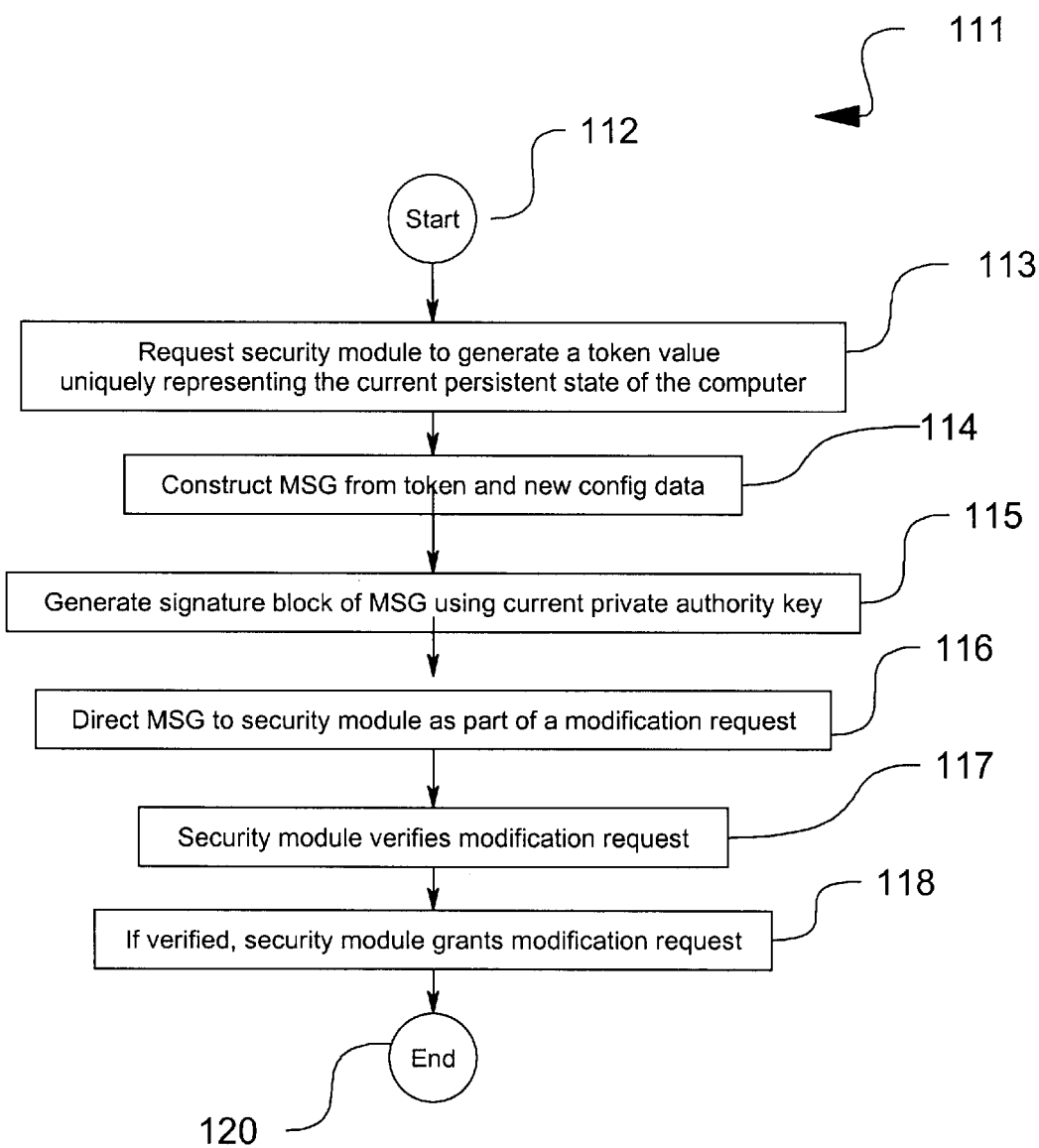
FIG. 3 is a flowchart illustrating one mode of operation in which the security module processes a request to reconfigure the computer.

FIG. 3 is a flow chart illustrates how the invention processes requests to reconfigure computer 10. For example, via this process, a holder of the private key that corresponds to the public key of the current trusted authority can modify trusted authority information 45, thereby transferring that trust to another authority whose identity is represented by another key pair. This process may be repeated to securely transfer trust to subsequent trusted authorities.

Figure 4:
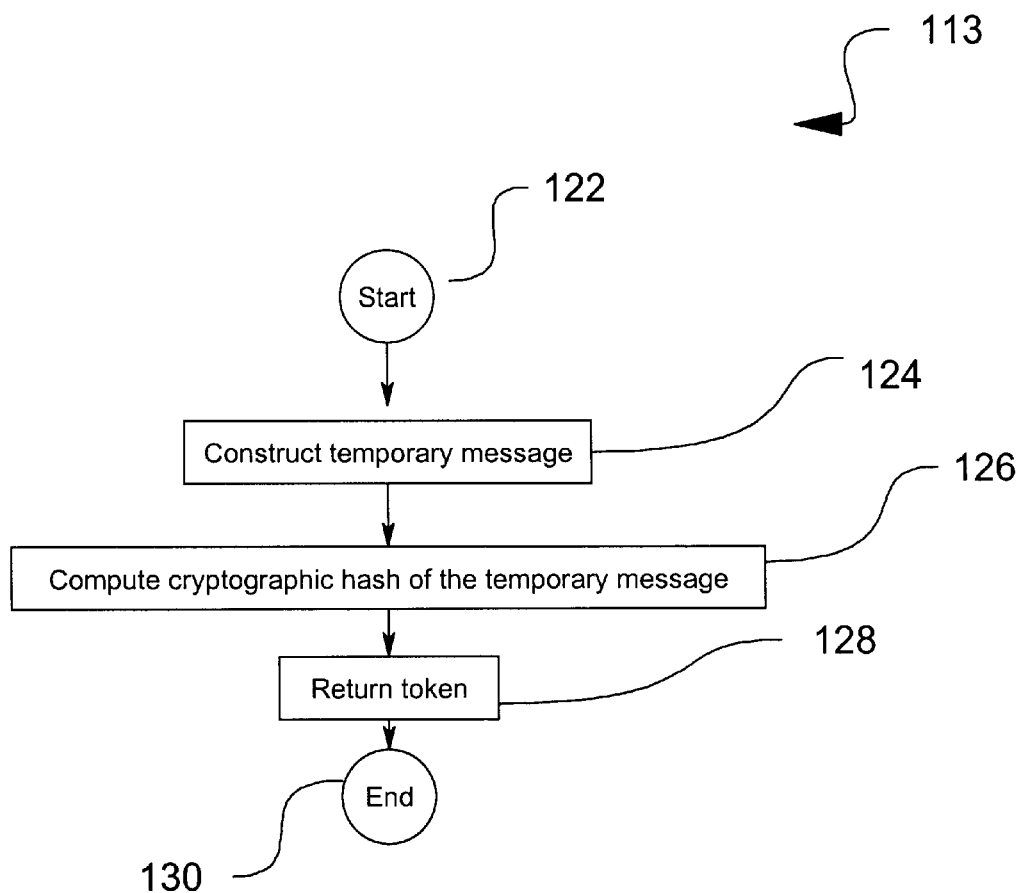
FIG. 4 is a flowchart illustrating one mode of operation in which the security module generates a token that uniquely represents the current configuration state of the computer.

Process 111 begins in block 112 and proceeds to block 113. In block 113 administrator 20 queries security module 30 for a token that uniquely represents the current persistent configuration state of computer 10. Generation of this token is explained in detail below and is illustrated in FIG. 4.

In block 114, administrator 20 constructs a message that contains the token and any modification information such as new configuration data 60 or a new public key to overwrite trusted authority information 45. After forming the message, in block 115 the administrator 20 generates a digital signature of the message using the private key for the current trusted authority. For example, initially the private key will be the private key that is generated in block 104 and is written to the utility disk in block 108 of FIG. 2.

In block 116, administrator 20 issues a request to configure computer 10. For example, the request may direct security module 30 to update trusted authority information 4 with a new trusted authority. The request is typically in the form of a function call through an application-programming interface (API) and is usually issued by either BIOS 35 or operating system 37. The request communicates the digital signature generated in block 115 as well the modification information.

In block 117, security module 30 validates the request to modify computer 10. The details of verification block 117 are explained below and illustrated in FIG. 5. If the digital signature is verified in block 117 then in step 118 security module 30 executes the requested modification and increments counter 50. For example, depending upon the request, security module 30 may overwrite the current public key held within persistent store 40 with the new public key contained within the request. In this manner, trusted authority information 45 is securely updated such that trust is securely transferred to the new trusted authority. As another example, security module 30 may update configuration data 60 as requested when the digital signature is verified. Process 111 terminates with block 120. This process may be repeated to again securely transfer the trust from one authority to another or to update configuration data 60.

FIG. 4 illustrates one embodiment of block 113 of FIG. 3 in which security module 30 generates the token that uniquely represents the current configuration state of computer 10. Generation of the token begins in block 122 and proceeds to block 124. In block 124 security module 30 constructs a temporary message by concatenating a unique identifier for computer 10 with the current value of persistent counter 50 that is maintained in persistent store 40. In this embodiment, the temporary message is not only unique to computer 10 but is unique in time and, therefore, cannot be replayed in the future to reconfigure computer 10. Other techniques are contemplated instead of a counter. For example, security module 30 may use a random number generator, a cryptographic hash of a previous value, or any other technique that produces a sequence of non-repeating values. In addition, security module 30 may also concatenate to the temporary message a unique identifier generated from a subset of configuration data 60. In this embodiment the message is unique to the subset and therefore cannot be used to configure other areas of computer 10.

In block 126 security module 30 generates the token by computing a cryptographic hash of the temporary message. This approach is advantageous in that the resulting token is a relatively short in length and does not expose any of the data that contributed to the message. The token may, however, be generated by any algorithm that results in a collision-free value generated from counter 50 and the unique identifier for computer 10. Alternatively, the temporary message itself may be used for the token. In block 128, security module 30 returns the token and discards the temporary message. The process terminates in block 130.

Figure 5:
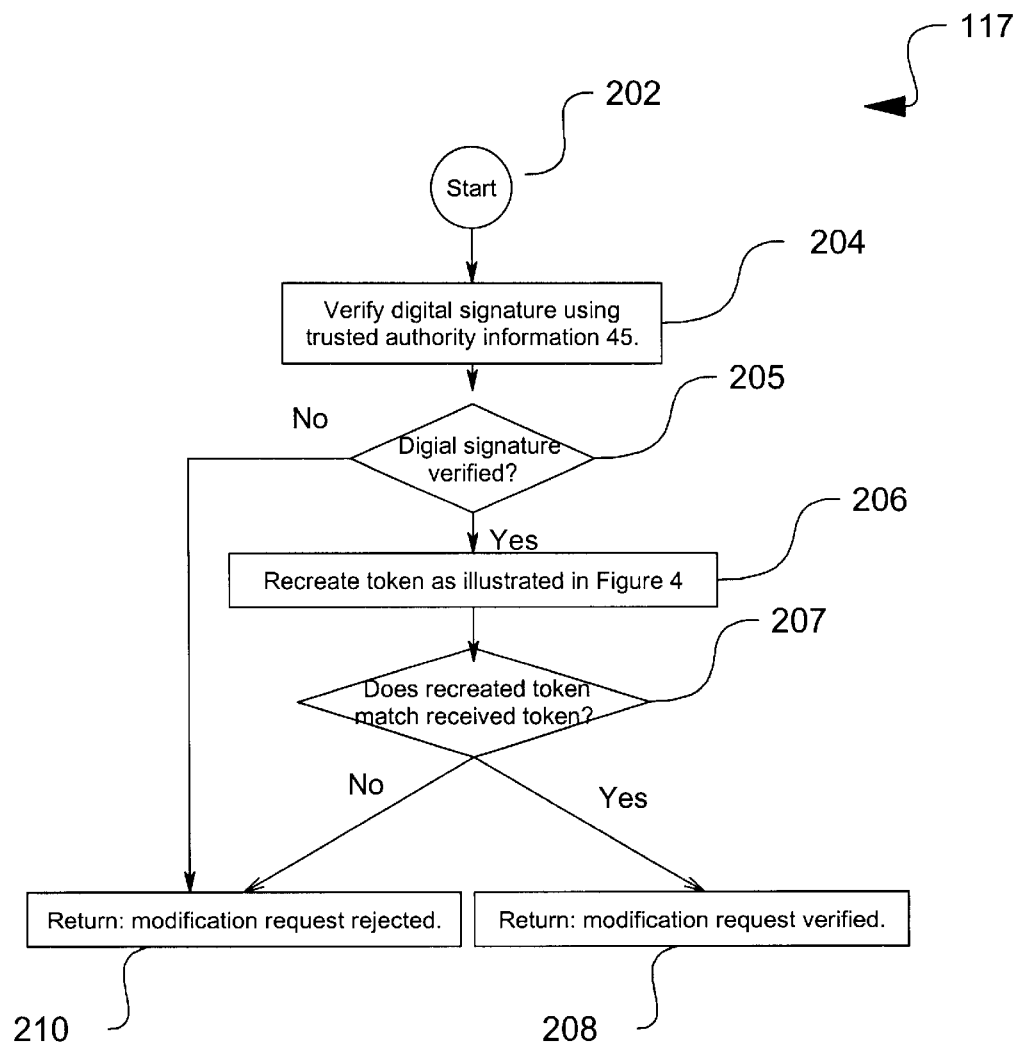
FIG. 5 is a flowchart illustrating one manner in which the security module validates the request to configure the computer.

FIG. 5 illustrates one embodiment of block 117 of FIG. 3 in which security module 30 validates a request to configure computer 10. The validation process begins in block 202 and proceeds to block 204. In block 204 security module 30 verifies that the digital signature was indeed sent by the current trusted authority using the public key that is currently within store 40. This digital signature verification also verifies that the request has not been altered since the request was signed. If the digital signature is not valid then security module 30 jumps from block 205 to block 210 and rejects the modification request. If the digital signature is valid then security module 30 proceeds to block 206.

In block 206, security module 30 creates a temporary token using the process described in FIG. 4. In block 207 security module compares the temporary token to the token received in the modification request. If the temporary token does not match the received token then security module 30 jumps to block 210 and rejects the modification request. If the tokens match then security module 30 proceeds to block 208 and validates the modification request.

The above processes and systems have been illustrated using asymmetric keys. However, a single symmetric key may readily be used with the invention. Symmetric-key cryptography, uses a single "key" to encrypt and decrypt messages. In this embodiment a symmetric key is written into persistent store 40; however, computer 10 is configured such that persistent store 40 may only be read by security module 30, thereby maintaining the secrecy of the symmetric key. In this manner, an encrypted request to modify configuration data 60, or to overwrite persistent store 40, is granted if the request is successfully validated with the stored symmetric key.

Various embodiments of a computing system have been described that include a security module for validating requests to reconfigure the computing system. In one particular embodiment, the present invention facilitates the secure transfer of trust from one trusted authority to another, such as from a manufacturer to a customer. In another embodiment the security module validates a request to overwrite configuration data such as the computer's boot image or compact verification data for verifying the computer's boot image. The security module determines whether the trusted authority issued the request. In addition, the security module guards against malicious replaying of the modification request by ensuring that the request is unique to the computing system and unique in time.

Also described is a manufacturing process for producing a computer having a security module that immediately prevents unauthorized individuals from tampering with the computer upon completion of the manufacturing process. In one embodiment, the manufacturer generates a unique key pair for each computer. In this embodiment, a boot disk is shipped with the computer, wherein the boot disk includes a utility for transferring trust from the manufacturer to the customer. In another embodiment, the customer generates the key pair and communicates the key pair to the manufacturer for use with one or more machines manufactured for the customer. In one embodiment the invention uses public key cryptography to ensure the integrity of the configuration data, while in another embodiment the invention uses symmetric key cryptography. This application is intended to cover any adaptation or variation of the present invention. It is intended that this invention be limited only by the claims and equivalents thereof.

I claim:

1. A computing system comprising:
   a persistent store to hold cryptographic information indicative of a trusted authority;

a security module to execute on the computing system, wherein the security module determines whether to grant a request to modify configuration data within the computing system as a function of the information within the persistent store and a temporary token generated to reflect a current configuration state of the computing system; and a software utility for directing the security module to overwrite the cryptographic information to the persistent store, wherein the cryptographic information within the persistent store includes a public digital key of an asymmetric key pair, and wherein the software utility communicates a second public digital key to the security module for overwriting the public digital key within the persistent store, wherein the overwriting transfers trust from a current trusted authority to a new trusted authority.

2. The system of claim 1, wherein the security module is integrated with a basic input-output system (BIOS) of the computing system.

3. The system of claim 1, wherein the persistent store is selected from a set of devices including flash memory, battery-backed complementary metal oxide semiconductor (CMOS) memory, and a magnetic storage device.

4. The system of claim 1, wherein the software utility is maintained on a disk for booting the computer.

5. The system of claim 1, further comprising a generator to produce a non-repeating sequence of values, wherein the security module determines whether to grant the request as a function of a generated value.

6. The system of claim 5, further comprising:

a generator to generate the temporary token, wherein the generator is selected from the set of a counter, a random number generator and a cryptographic hash.

7. A method of configuring a computer comprising:

generating information indicative of a trusted authority, including generating an asymmetric digital key pair including a first digital key and a second digital key, and further wherein storing the information includes storing the first digital key in the persistent store;

storing the information in a persistent store of a computer;

generating a temporary token to reflect a current configuration state of the computer;

storing the second digital key on a storage medium; and storing a software utility on the storage medium, wherein the software utility generates a digital signature from the second digital key in order to overwrite the information within the persistent store to transfer trust from a current trusted authority to a new trusted authority.

8. The method of claim 7, wherein generating the key pair includes receiving the digital key from a customer for use with machines manufactured for the customer.

9. A method for configuring a computing system comprising:

receiving a request to reconfigure the computing system;

validating the request as a function of a temporary token generated to reflect a current configuration state of the computing system and trusted authority information maintained in a persistent store of the computing system; and configuring the computing system when the request is validated, wherein configuring the computing system comprises overwriting the trusted authority information in the persistent store, wherein the overwriting transfers trust from a current trusted authority to a new trusted authority.

10. The method of claim 9, wherein validating the request includes determining whether a digital signature contained within the request was issued by a trusted authority identified by the trusted authority information.

11. The method of claim 9, wherein validating the request includes comparing the temporary token to a token within the request.

12. The method of claim 9, wherein validating the request includes:

(a) producing a value from a sequence of non-repeating values, (b) generating a temporary token as a function of the value, and (c) comparing the temporary token to a token within the request.

13. The method of claim 12, wherein producing the value includes performing at least one of the following steps:

(a) incrementing a counter, (b) generating a random number, and (c) calculating a cryptographic hash.

14. The method of claim 9, wherein configuring the computing system includes overwriting a boot image of the computer system.

15. The method of claim 9, wherein configuring the computing system includes downloading a new boot image from a network.

16. The method of claim 9, wherein configuring the computing system includes overwriting compact verification data corresponding to a boot image.

17. A method for securely transferring trust in a computer system from a first trusted authority to a second trusted authority comprising:

receiving a request to overwrite first trusted authority information stored in a persistent store of the computer system with information indicative of a second trusted authority;

validating the request as a function of the first trusted authority information and a temporary token generated to reflect a current configuration state of the computer system and; and overwriting the information within the persistent store with the information indicative of the second trusted authority when the request was determined to be issued by the first trusted authority.

18. The method of claim 17, wherein validating the request includes determining whether the request was issued by the first trusted authority.

19. The method of claim 17, wherein validating the request includes determining whether the request is unique to the computing system.

20. The method of claim 17, wherein validating the request includes determining whether the request is unique in time.

21. The method of claim 17, wherein the information indicative of a first trusted authority is cryptographic information.

22. The method of claim 21, wherein the cryptographic information is a public digital key of an asymmetric key pair.

23. The method of claim 21, wherein the cryptographic information is a symmetric key and the persistent store may only be read by a security module.

24. The method of claim 17, wherein the information indicative of a first trusted authority is stored in the persistent store during manufacturing.

25. The method of claim 17, wherein validating the request includes verifying a digital signature.

26. A computer-readable medium having computer-executable instructions, wherein the instructions when executed by a computer system, comprise:

receiving a request to overwrite first trusted authority information stored in a persistent store of the computer system with information indicative of a second trusted authority;

validating the request as a function of the first trusted authority information and a temporary token generated to reflect a current configuration state of the computer system and; and overwriting the information within the persistent store with the information indicative of the second trusted authority when the request was determined to be issued by the first trusted authority.

27. The computer-readable medium of claim 26, wherein validating the request includes determining whether the request was issued by the first trusted authority.

28. The computer-readable medium of claim 26, wherein validating the request includes determining whether the request is unique to the computing system.

29. The computer-readable medium of claim 26, wherein validating the request includes determining whether the request is unique in time.

30. The computer-readable medium of claim 26, wherein the information indicative of a first trusted authority is cryptographic information.

31. The computer-readable medium of claim 30, wherein the cryptographic information is a public digital key of an asymmetric key pair.

32. The computer-readable medium of claim 30, wherein the cryptographic information is a symmetric key and the persistent store may only be read by the security module.

33. The computer-readable medium of claim 26, wherein the information indicative of a first trusted authority is stored in the persistent store during manufacturing.

34. The computer-readable medium of claim 26, wherein validating the request includes verifying a digital signature.

* * * * *